United States Patent
Hymel

(10) Patent No.: US 8,660,531 B2
(45) Date of Patent: Feb. 25, 2014

(54) ACCESS TO LOCKED FUNCTIONS
(75) Inventor: James Allen Hymel, Kitchener (CA)
(73) Assignee: BlackBerry Limited, Waterloo (CA)
( * ) Notice: Subject to any disclaimer, the term of this patent is extended or adjusted under 35 U.S.C. 154(b) by 474 days.
(21) Appl. No.: 12/938,990
(22) Filed: Nov. 3, 2010
(65) Prior Publication Data
US 2012/0108166 A1 May 3, 2012
(51) Int. Cl.
*H04M 1/66* (2006.01)
*H04M 1/68* (2006.01)
*H04M 3/16* (2006.01)
*H04M 3/00* (2006.01)
*H04M 1/00* (2006.01)
*G05B 19/00* (2006.01)
*G05B 23/00* (2006.01)
*G06F 7/00* (2006.01)
*G06F 7/04* (2006.01)
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)
*G01S 13/00* (2006.01)
*G06F 3/02* (2006.01)
*G09G 5/00* (2006.01)
*G06F 3/041* (2006.01)
*H04N 7/14* (2006.01)
*H04N 5/222* (2006.01)
*G06K 9/00* (2006.01)
(52) U.S. Cl.
USPC ..... 455/411; 455/418; 455/550.1; 455/556.1; 455/575.3; 340/5.1; 341/22; 345/168; 345/173; 348/14.02; 348/333.01; 382/115; 382/118
(58) Field of Classification Search
USPC .......... 455/1, 26.1, 41.2, 58.2, 410, 411, 418, 455/456.4, 550.1, 556.1, 565, 575.1, 575.3, 455/628, 456.1, 566; 341/22; 345/155, 168, 345/172, 166, 173, 418, 690; 379/62, 161; 380/247–250; 382/118; 340/5.54, 571; 348/14.01, 222.1
See application file for complete search history.

(56) References Cited

U.S. PATENT DOCUMENTS 6,501,380 B1  12/2002 Jakobsson
(Continued)

FOREIGN PATENT DOCUMENTS

EP  1914961 A1  4/2008
(Continued)

OTHER PUBLICATIONS

Examination Report mailed Jun. 22, 2012, in corresponding European patent application No. 10189894.8.
(Continued)

*Primary Examiner* — Yuwen Pan
*Assistant Examiner* — Paul P Tran
(74) *Attorney, Agent, or Firm* — Novak Druce Connolly Bove + Quigg LLP

(57) ABSTRACT

A mobile communications device can have a locked mode in which the mobile communications device is protected against unauthorized use. A mobile communications device includes device applications implemented by a software program or firmware program that enables an application to be temporarily operable or operable under certain conditions when the mobile communications device is locked. Device applications can include a camera enabled for image data acquisition and a microphone or an audio recorder or a microphone and an audio recorder enabled for audio data acquisition. Acquired image data and audio data can be stored locally to the mobile communications device or stored externally to the mobile communications device. The mobile communications device can be configured to operate applications under different conditions. The mobile communications device can be configured to display a message that applications have been operated while the mobile communications device was locked or in a locked mode.

13 Claims, 10 Drawing Sheets

(56) References Cited

U.S. PATENT DOCUMENTS

| | | | |
|---|---|---|---|
| 7,394,347 B2 | 7/2008 | Kady | |
| 7,415,416 B2 | 8/2008 | Rees | |
| 2005/0003799 A1 | 1/2005 | Kang | |
| 2005/0116840 A1* | 6/2005 | Simelius | 341/22 |
| 2005/0197103 A1 | 9/2005 | Inoue | |
| 2006/0189345 A1* | 8/2006 | Suzuki et al. | 455/550.1 |
| 2006/0284969 A1* | 12/2006 | Kim et al. | 348/14.01 |
| 2007/0009139 A1* | 1/2007 | Landschaft et al. | 382/115 |
| 2007/0167196 A1* | 7/2007 | Yamashita et al. | 455/575.1 |
| 2008/0254767 A1 | 10/2008 | Jin | |
| 2009/0141948 A1* | 6/2009 | Nakaoka et al. | 382/118 |
| 2009/0258676 A1* | 10/2009 | Tanaka | 455/556.1 |
| 2009/0316960 A1* | 12/2009 | Wang | 382/115 |
| 2012/0009896 A1* | 1/2012 | Bandyopadhyay et al. | 455/411 |

FOREIGN PATENT DOCUMENTS

| | | |
|---|---|---|
| WO | 03075585 A1 | 9/2003 |
| WO | 2010037898 A1 | 4/2010 |

OTHER PUBLICATIONS

Extended European Search report mailed May 20, 2011. In corresponding application No. 10189894.8.
Nokia N79: Firmware Update auf v 11.049- Phone, Camera, Music, Video, Application . Dec. 23, 2008.

\* cited by examiner

ACCESS TO LOCKED FUNCTIONS

FIELD OF THE TECHNOLOGY

The present disclosure relates generally to mobile communications devices. More specifically, enabling implementations relate to mobile communications devices having a lock mode that can be bypassed and incorporating a camera assembly. The technology provides means and methods whereby a camera assembly in a mobile communications device may be utilized under certain conditions without compromising security of the mobile communications device. The technology extends the functionality of device applications in a secure manner. In at least one implementation, the technology provides for the temporary utilization of one or more mobile communication device applications without the inputting of an otherwise required password. The technology can be customized dynamically on a per device basis.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

Figure 1:
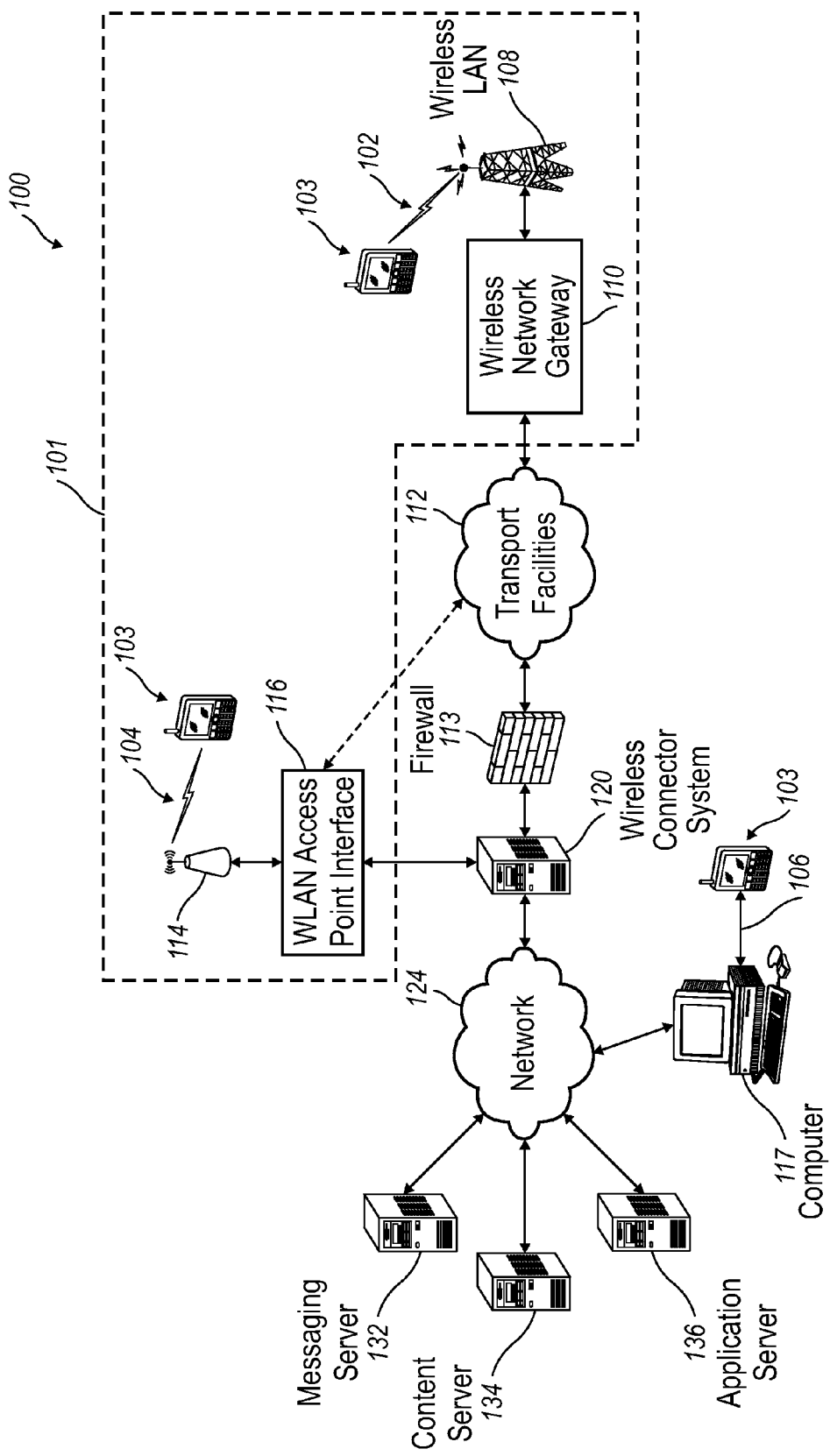
FIG. 1 illustrates a communication system including a mobile communications device to which example implementations of the technology can be applied.

In order to facilitate an understanding of environments in which example implementations described herein can operate, reference is made to FIG. 1, which shows, in block diagram form, a communication system 100 in which implementations of the technology can be applied. The communication system 100 may comprise a number of mobile communications devices 103 that may be connected to the remainder of system 100 in any of several different ways. Accordingly, several instances of mobile communications devices 103 are depicted in FIG. 1 employing different example ways of connecting to system 100.

These figures are exemplary only, and those persons skilled in the art will appreciate that additional elements and modifications may be necessary to make the communications device, e.g., 103 operable in particular network environments. While in the illustrated implementations, the communication devices, e.g., 103 may comprise smart phones, in other implementations, the communications devices may comprise personal digital assistants (PDA), tablet computers, laptop computers, desktop computers, servers, or other communications devices capable of sending and receiving electronic messages.

Mobile communications devices 103 are connected to a wireless network 101 that may comprise one or more of a Wireless Wide Area Network (WWAN) 102 and a Wireless Local Area Network (WLAN) 104 or other suitable network arrangements. In some implementations, the mobile communications devices 103 are configured to communicate over both the WWAN 102 and WLAN 104, and to roam between these networks. In some implementations, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 where each of the base stations 108 provides wireless Radio Frequency (RF) coverage to a corresponding area or cell. The WWAN 102 is typically operated by a mobile network service provider that provides subscription packages to users of the mobile communications devices 103. In some implementations, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the mobile communications devices 103 to transport facilities 112, and through the transport facilities 112 to a wireless connector system 120. Transport facilities may include one or more private networks or lines, the Internet, a virtual private network, or any other suitable network. The wireless connector system 120 may be operated, for example, by an organization or enterprise such as a corporation, university, or governmental department, which allows access to a network 124 such as an internal or enterprise network (e.g., an intranet), and its resources, or the wireless connector system 120 may be operated by a mobile network provider. In some implementations, the network 124 may be realized using the Internet rather than, or in addition to, an internal or enterprise network.

The wireless network gateway 110 provides an interface between the wireless connector system 120 and the WWAN 102, which facilitates communication between the mobile communications devices 103 and other devices (not shown) connected, directly or indirectly, to the WWAN 102. Accordingly, communications sent via the mobile communications devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communications devices 103.

The WLAN 104 comprises a wireless network that, in some implementations, conforms to IEEE 802.11x standards (sometimes referred to as Wi-Fi™) such as, for example, the IEEE 802.11a, 802.11b and/or 802.11g standard. Other communication protocols may be used for the WLAN 104 in other implementations such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly, (for example, if the access point 114 is part of an enterprise WLAN 104 in which the wireless connector system 120 resides), or indirectly, as indicated by the dashed line in FIG. 1, via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email, Hypertext Transfer Protocol (HTTP), and HTTP Secure (HTTPS) communications to and from a set of managed mobile communications devices 103. The wireless connector system 120 also provides administrative control and management capabilities over users and mobile communications devices 103 that might connect to the wireless connector system 120.

The wireless connector system 120 allows the mobile communications devices 103 to access the network 124 and connected resources and services such as a messaging server 132 (for example, a Microsoft Exchange Server®, IBM Lotus Domino®, or Novell GroupWise™ email server), a content server 134 for providing content such as Internet content or content from an organization's internal servers, application servers 136 for implementing server-based applications such as instant messaging (IM) applications to mobile communications devices 103, and intranet file services.

The wireless connector system 120 typically provides a secure exchange of data (e.g., email messages, personal information manager (PIM) data, and IM data) with the mobile communications devices 103. In some implementations, communications between the wireless connector system 120 and the mobile communications devices 103 are encrypted. In some implementations, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some implementations, the private encryption key is stored only in the user's mailbox on the messaging server 132 and on the mobile communications device 103, and can typically be regenerated by the user on mobile communications devices 103. Data sent to the mobile communications devices 103 is encrypted by the wireless connector system 120 using the private encryption key retrieved from the user's mailbox. The encrypted data, when received on the mobile communications devices 103, is decrypted using the private encryption key stored in memory. Similarly, data sent to the wireless connector system 120 from the mobile communications devices 103 is encrypted using the private encryption key stored in the memory of the mobile communications device 103. The encrypted data, when received on the wireless connector system 120, is decrypted using the private encryption key retrieved from the user's mailbox.

The wireless network gateway 110 is adapted to send data packets received from the mobile communications device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination mobile communications device 103. The AP interfaces 116 of the WLAN 104 provide similar sending functions between the mobile communications device 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. A mobile communications device 103 may alternatively connect to the wireless connector system 120 using a computer 117, such as desktop or notebook computer, via the network 124. A link 106 may be provided for exchanging information between the mobile communications device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communications device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communications devices 103. Suitable variations of the communication system will be understood to a person of skill in the art and are intended to fall within the scope of the present disclosure.

Figure 5:
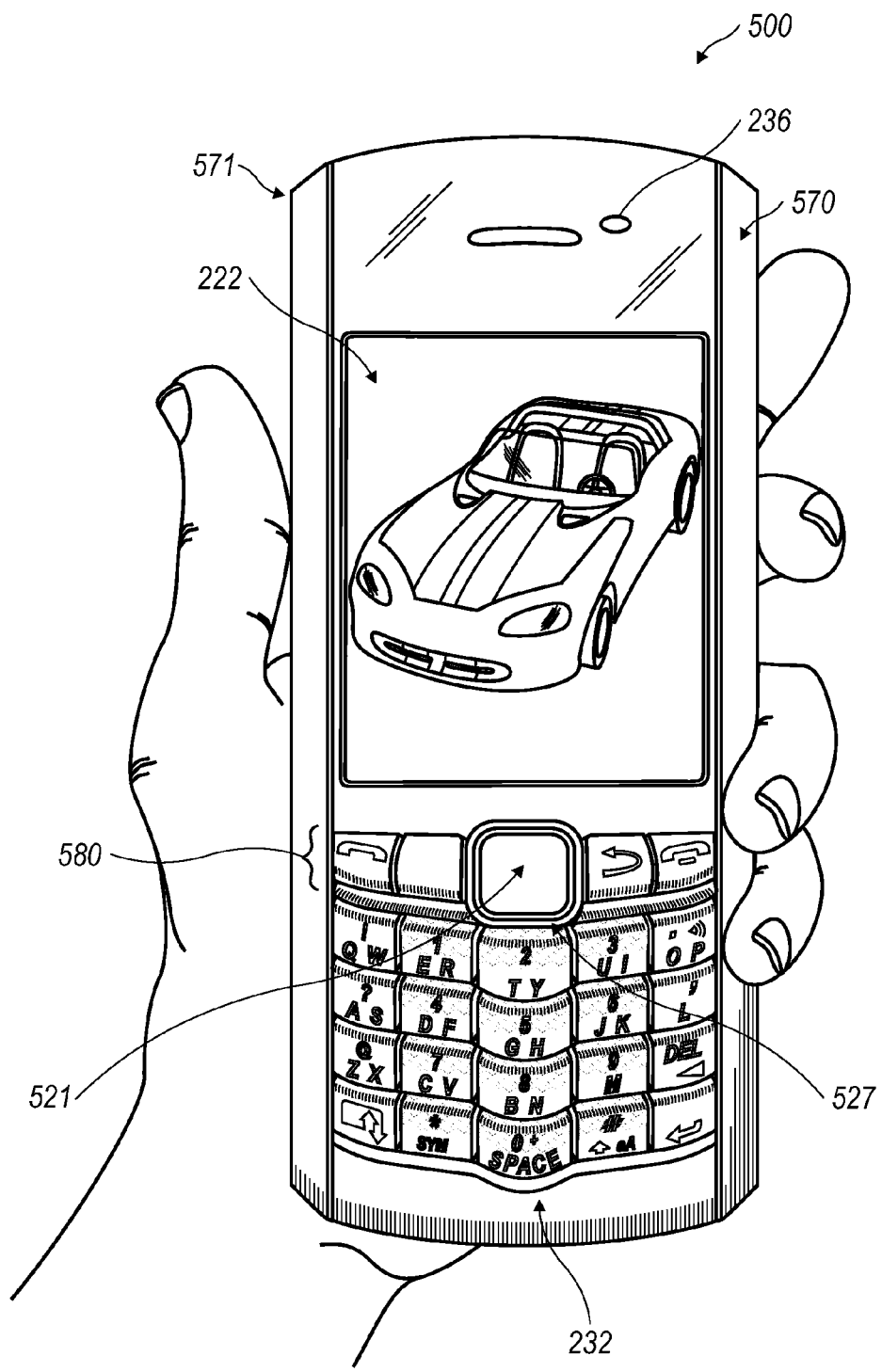
FIG. 5 illustrates a front view of a mobile communications device to which example implementations of the technology can be applied.

As will be appreciated from FIG. 5, an exemplary mobile communications device 500 (as an example of 103) comprises a display 222 located above a keyboard 232 constituting a user input means that is suitable for accommodating textual input to the device 500. In some implementations, the keyboard 232 can be part of a touch screen display 522. The front face 570 of the device 500 has a navigation row 580. As shown, the device 500 is of uni-body construction, also known as a "candy-bar" design.

The device 500 may include an auxiliary input that acts as a cursor navigation tool 527 and that may be also exteriorly located upon the front face 570 of the device 500. The front face location of a cursor navigation tool 527 allows the tool to be thumb-actuable, e.g., like the keys of the keyboard 232. Some implementations of the technology provide the navigation tool 527 in the form of a trackball (not shown) that may be utilized to instruct two-dimensional screen cursor movement in substantially any direction, as well as act as an actuator when the trackball is depressed like a button. Other implementations can provide the navigation tool in the form of a trackpad, a touchpad, a pointing stick, joystick, graphics tablet, or combinations thereof. The placement of the navigation tool 527 can be above the keyboard 232 and below the display 222; here, it may avoid interference during keyboarding and does not block the operator's view of the display 222 during use.

The device 500 may be configured to send and receive messages. The device 500 includes a body 571 that can, in some implementations, be configured to be held in one hand by an operator of the device 500 during text entry. A display 222 is included that is located on a front face 570 of the body 571 and upon which information is displayed to the operator, e.g., during text entry. The device 500 may also be configured to send and receive voice communications such as mobile telephone calls. The device 500 also can include a camera 221 to allow the device 500 to take electronic photographs that can be referred to as photos or pictures or image data. The device 500 can include an audio recorder 223 that can be incorporated into a microphone 236 or can be separated from a microphone 236. Further, the device 500 can be configured to operate a web browser.

The device 500 may further contain a sensor, e.g., proximity sensor, behind a cover mounted in an aperture defined in body 571. In devices where substantially all the front face 570 of the device is a touch screen, a portion of the touch screen can constitute the cover.

Figure 2:
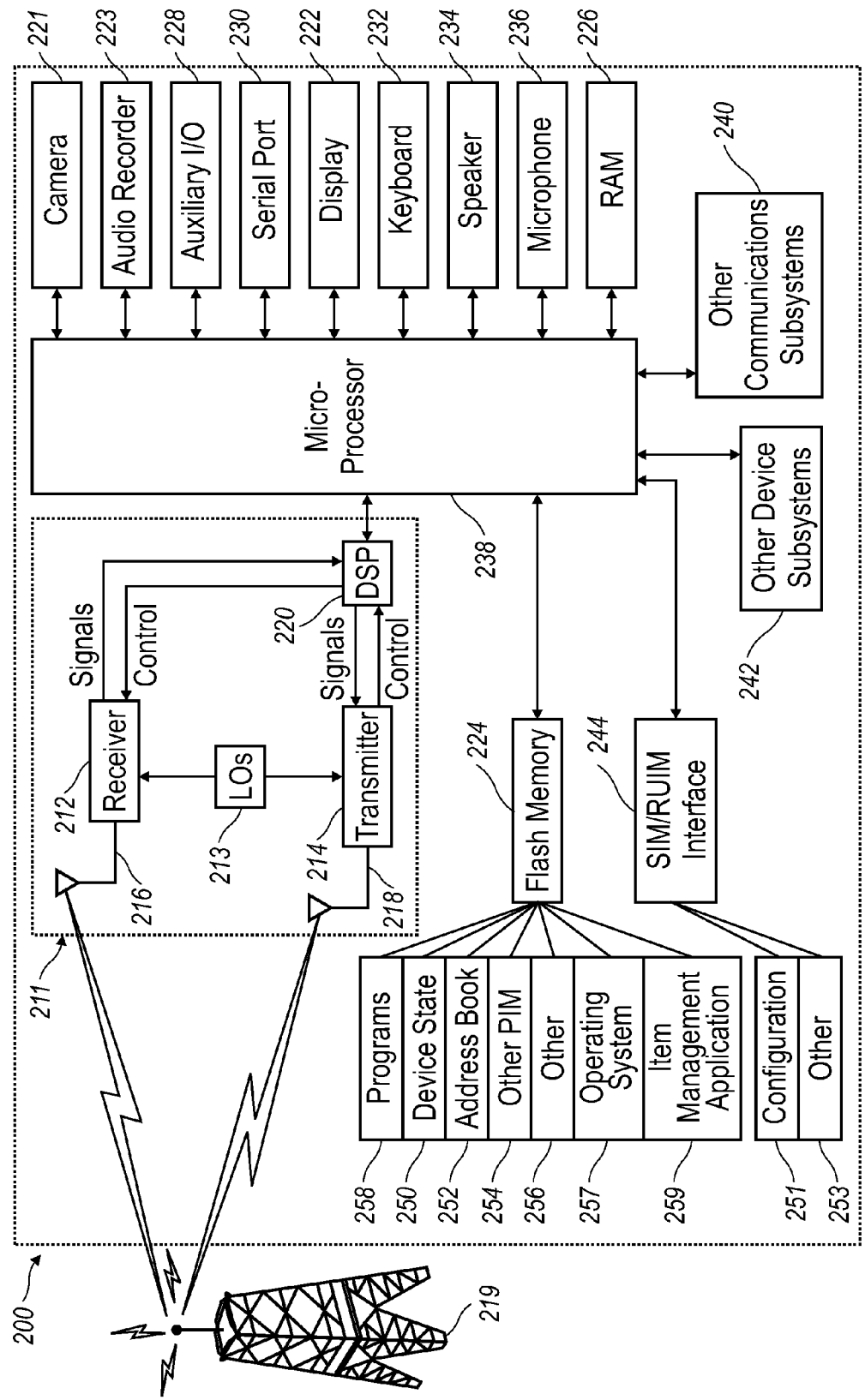
FIG. 2 illustrates a block diagram of a mobile communications device.

Referring to FIG. 2, a block diagram of a communications device, such as 500 and 103, in accordance with an exemplary implementation is illustrated. As shown, the device 500 includes a processor 238 that controls the operation of the communications device 500. A communication subsystem 211 performs communication transmission and reception with the wireless network 219. The microprocessor 238 further can be communicatively coupled with an auxiliary input/output (I/O) subsystem 228. In at least one implementation, the processor 238 can be communicatively coupled to a serial port (for example, a Universal Serial Bus port) 230 that can allow for communication with other devices or systems via the serial port 230. A display 222 can be communicatively coupled to processor 238 to allow for display of information to an operator of the communications device 500. When the communications device 500 is equipped with a keyboard 232, the keyboard can also be communicatively coupled with the processor 238. The communications device 500 can include a speaker 234, a microphone 236, random access memory (RAM) 226, and flash memory 224, all of which may be communicatively coupled to the processor 238. Other similar components may be provided on the communications device 500 as well and optionally communicatively coupled to the processor 238. Other communication subsystems 240 and other device subsystems 242 are generally indicated as being functionally connected with the processor 238 as well. An example of a communication subsystem 240 is a short range communication system such as BLUETOOTH® communication module or a WI-FI® communication module (a communication module in compliance with IEEE 802.11b) and associated circuits and components. Examples of other device subsystem 242 include a sensor and implementations of the present technology.

Additionally, the processor 238 is able to perform operating system functions and enables execution of programs on the communications device 500. In some implementations not all of the above components are included in the communications device 500. For example, in at least one implementation, the keyboard 232 is not provided as a separate component and is instead integrated with a touch screen as described below.

The auxiliary I/O subsystem 228 can take the form of a variety of different navigation tools (mufti-directional or single-directional) such as a trackball navigation tool 521, as illustrated in the exemplary implementation shown in FIG. 5, or a thumbwheel, a navigation pad, a joystick, touch-sensitive interface, or other I/O interface. These navigation tools may be located on the front surface of the communications device 500 or may be located on any exterior surface of the communications device 500. Other auxiliary I/O subsystems may include external display devices and externally connected keyboards (not shown). While the above examples have been provided in relation to the auxiliary I/O subsystem 228, other subsystems capable of providing input or receiving output from the communications device 500 are considered within the scope of this disclosure. Additionally, other keys may be placed along the side of the communications device 500 to function as escape keys, volume control keys, scrolling keys, power switches, or user programmable keys, and may likewise be programmed accordingly.

The keyboard 232 can include a plurality of keys that can be of a physical nature such as actuable buttons, or the actuable buttons can be of a software nature, typically constituted by representations of physical keys on a display 222 (referred to herein as "virtual keys"). It is also contemplated that the user input can be provided as a combination of the two types of keys. Each key of the plurality of keys is associated with at least one action that can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display 222, which in one implementation is enabled by touching the display 222, for example, with a stylus, finger, finger tip, finger nail, or other pointer, to generate the character or activate the indicated command or function. Some examples of displays 222 capable of detecting a touch include resistive, capacitive, projected capacitive, infrared and surface acoustic wave (SAW) touch screens.

Physical and virtual keys can be combined in many different ways as appreciated by those skilled in the art. In one implementation, physical and virtual keys are combined such that the plurality of enabled keys for a particular program or feature of the communications device 500 is shown on the display 222 in the same configuration as the physical keys. Using this configuration, the operator can select the appropriate physical key corresponding to what is shown on the display 222. Thus, the desired character, command or function is obtained by depressing the physical key corresponding to the character, command or function displayed at a corresponding position on the display 222, rather than touching the display 222.

Furthermore, the communications device 500 is equipped with components to enable operation of various programs, as shown in FIG. 2. In an exemplary implementation, the flash memory 224 is enabled to provide a storage location for the operating system 257, device programs 258, and data. The operating system 257 is generally configured to manage other programs 258 that are also stored in memory 224 and executable on the processor 238. The operating system 257 honors requests for services made by programs 258 through predefined program interfaces. More specifically, the operating system 257 typically determines the order in which multiple programs 258 are executed on the processor 238 and the execution time allotted for each program 258, manages the sharing of memory 224 among multiple programs 258, handles input and output to and from other device subsystems 242, and so on. In addition, operators typically can interact directly with the operating system 257 through a user interface usually including the keyboard 232 and display 222. While in an exemplary implementation the operating system 257 is stored in flash memory 224, the operating system 257 in other implementations is stored in read-only memory (ROM) or similar storage element (not shown). As those skilled in the art will appreciate, the operating system 257, device program 258, or parts thereof, may be loaded in RAM 226 or other volatile memory.

In some implementations, the flash memory 224 may contain programs 258 for execution on the device 500, including—but not limited to—an address book 252, a personal information manager (PIM) 254, and a device state 250. Furthermore, programs 258, such as social software, and other information 256 including data can be segregated upon storage in the flash memory 224 of the device 500.

When the communications device 500 is enabled for two-way communication within the wireless communication network 219 (e.g., 108), it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-T9), Ultra Mobile Broadband (UMB) networks, Worldwide Interoperability for Microwave Access (WiMAX), and other networks that can be used for data and voice, or just data or voice. For the systems listed above, the communications device 500 may use a unique identifier to enable the communications device 500 to transmit and receive signals from the communication network 219. Other systems may not use such identifying information. GPRS, UMTS, and EDGE use a Subscriber Identity Module (SIM) in order to allow communication with the communication network 219. Likewise, most CDMA systems use a Removable User Identity Module (RUIM) in order to communicate with the CDMA network. The RUIM and SIM card can be used in multiple different communications devices 500. A communications device 500 can be configured to operate some features without a SIM/RUIM card, but a communications device will not necessarily be able to communicate with the network 219. A SIM/RUIM interface 244 located within the communications device 500 allows for removal or insertion of a SIM/RUIM card (not shown). The SIM/RUIM card features memory and holds key configurations 251, and other information 253 such as identification and subscriber related information. With a properly enabled communications device 500, two-way communication between the communications device 500 and communication network 219 is possible.

If the communications device 500 is enabled as described above or the communication network 219 does not use such enablement, the two-way communication enabled communications device 500 is able to both transmit and receive information from the communication network 219. The transfer of communication can be from the communications device 500 or to the communications device 500. In order to communicate with the communication network 219, the device 500 can be equipped with an integral or internal antenna 218 for transmitting signals to the communication network 219. Likewise the device 500 can be equipped with another antenna 216 for receiving communication from the communication network 219. These antennae (216, 218) in another exemplary implementation are combined into a single antenna (not shown). As one skilled in the art would appreciate, the antenna or antennae (216, 218) in another implementation can be externally mounted on the communications device 500.

When equipped for two-way communication, the communications device 500 features a communication subsystem 211. As is understood in the art, a communication subsystem 211 is modified so that a communication subsystem can support the operational needs of a communications device 500. The subsystem 211 includes a transmitter 214 and receiver 212 including the associated antenna or antennae (216, 218) as described above, local oscillators (LOs) 213, and a processing module that in the presently described exemplary implementation is a digital signal processor (DSP) 220.

It is contemplated that communication by the communications device 500 with the wireless network 219 can be any type of communication that both the wireless network 219 and communications device 500 are enabled to transmit, receive and process. In general, these can be classified as voice or data, or both voice and data. Voice communication generally refers to communication in which signals for audible sounds are transmitted by the communications device 500 through the communication network 219. Data generally refers to all other types of communication that the communications device 500 is capable of performing within the constraints of the wireless network 219.

Example device programs that can depend on such data include email, contacts and calendars. For each such program, synchronization with home-based versions of the program can be desirable for either or both of the long term utility of device programs and the short term utility of device programs. As an example, emails are often time-sensitive, so substantially real time (or near-real time) synchronization may be desired. Contacts, on the other hand, can be usually updated less frequently without inconvenience. Therefore, the utility of the communications device 500 is enhanced when connectable within a communication system, and when connectable on a wireless basis in a network 219 in which voice, text messaging, and other data transfer are accommodated. Device 500 can include programs such as a web browser, a file browser, and client programs for interacting with server programs. Devices, e.g., 103, 500, for use in the technology can be characterized by an identification number assigned to the device. Such identification numbers cannot be changed and are locked to each device.

Implementations of the technology can be realized as including programming on a mobile communications device, e.g., 103. In some implementations, programming for the technology is on the mobile communications device 103, while data used by the mobile communications device 103 is on the wireless connector system 120 or a network server such as content server 134, messaging server 132, or application server 136. In some implementations, programming for the technology can be realized on a remote server. Allocation of functionality among architectural elements can be a function of several factors including latency, processing resource availability and efficient usage, storage availability and efficient usage, and revenue opportunities.

In at least one implementation of the technology, in order to protect against unauthorized use, a mobile communications device can be locked such that a password or text must be entered via a keyboard 232 before device applications are enabled. A locked device 500 can be described as being in a locked mode. Situations can arise however, where it may be advantageous for certain device applications to be enabled even when a mobile communications device is in a locked mode. One example is the situation in which a user desires to use the camera 221 of the device 500 without having to enter a password. A situation in which a user desires to use the camera 221 of the device 500 without entering a password could occur, for example, when, during the time it would take to enter a password, the opportunity to take a photograph of a subject might pass. For example, a user who otherwise had not planned to take a photograph might observe a subject and desire to take a photograph quickly.

In some implementations of the technology, a mobile communications device comprises a locked function usage accumulator. The locked function usage accumulator comprises a current value and a predetermined limit. As examples, the predetermined limit may correspond to a number of photographs or a number of images. In this example, the locked function usage accumulator keeps track of the number of acquired images or stored images as the current value and the number of acquired images or stored images is compared to the predetermined limit. The current value can be compared to predetermined limit. If the current value is less than the predetermined limit, then the locked function, such as acquisition of image data or taking a photograph, can be performed using the camera.

In some implementations of the technology, the locked function usage accumulator comprises a current value and a predetermined limit. The predetermined limit may correspond to an amount of image data acquired or an amount of image data stored. In these implementations the locked function usage accumulator keeps track of the amount of image data acquired by the device 500 or the amount of image data stored by the device 500 as the current value, and the amount of image data acquired or the amount of image data stored is compared to the predetermined limit. If the current value is less than the predetermined limit, then the locked function, in this example, acquisition of image data or taking a photograph, can be performed using the camera 221.

Figure 3:
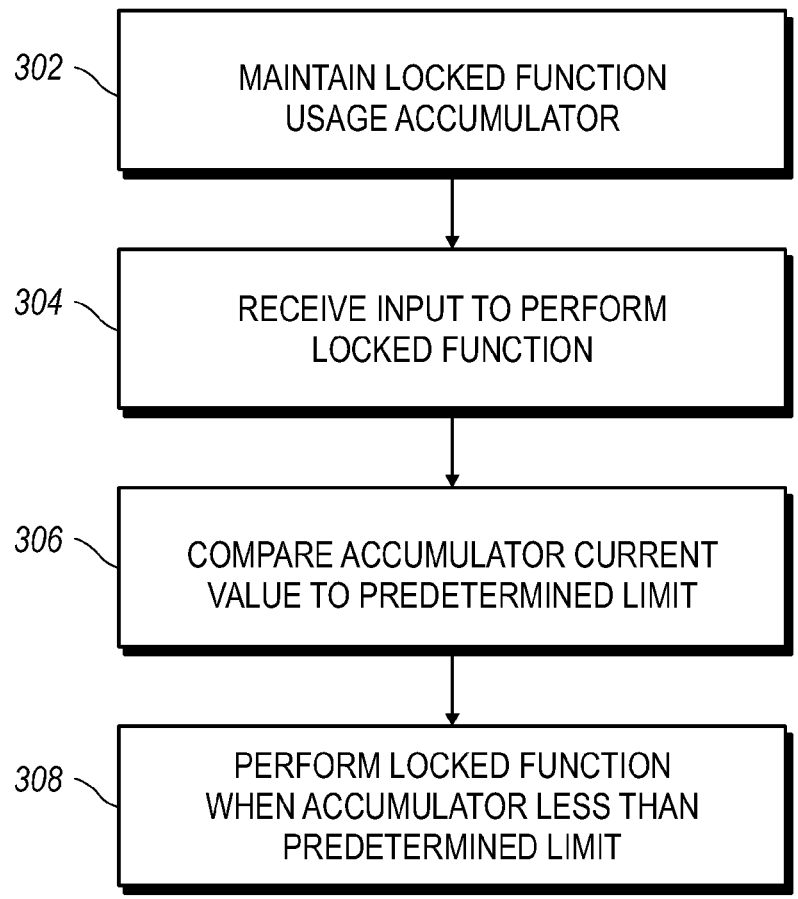
FIG. 3 illustrates the steps of an exemplary method within the technology.

FIG. 3 illustrates the steps in a method within this technology that can implement the example described in the preceding paragraph. A mobile communications device 500 is configured to maintain a locked function accumulator 302. The mobile communications device receives input to perform a locked function 304. As examples, the input to perform a locked function may be the depression of a certain button on the device 500, for example a camera button, or the touching of a certain area on a touch screen display 222. The current value of the locked function usage accumulator is compared to the predetermined limit. If the current value of the locked function usage accumulator is less than the predetermined limit the locked function, for example the taking of a photograph, is performed.

The mobile communications device 500 within this technology can increment the current value when a locked function occurs or is performed by the device 500. Thus, for example, a device 500 can allow five photographs to be acquired while the device 500 is in a locked mode. The predetermined limit will therefore be understood to be five photographs or images. The current value is initially set to zero. Each time an image is acquired, the current value of the locked function usage accumulator is incremented by one. Each time the device 500 receives an input to perform a locked function, the current value (number of photographs taken), is compared to the predetermined limit of five photographs. Thus, when five photographs have been taken, the current value and the predetermined limit are equal. Thus, the device 500 will not perform the locked function because the current value comprised by the locked function usage accumulator is not less than the predetermined limit.

Figure 4:
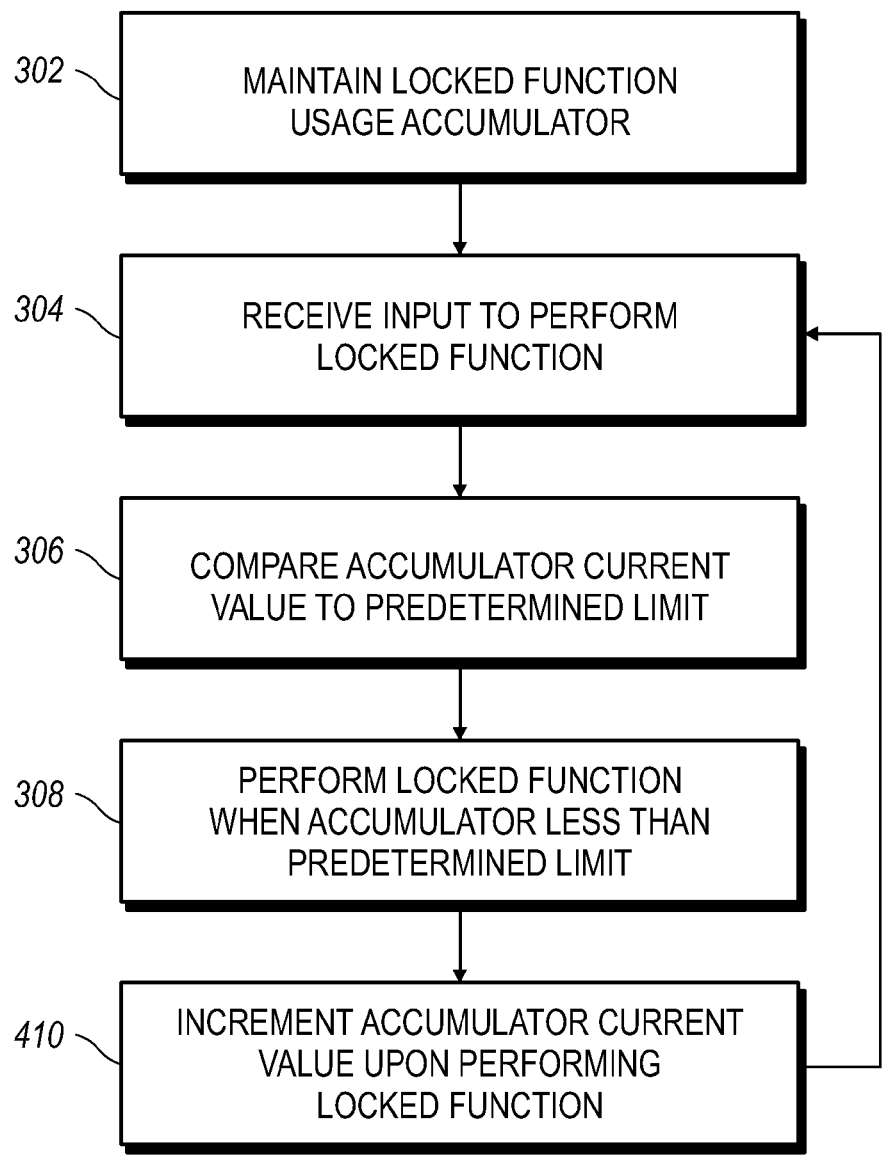
FIG. 4 illustrates the steps of an exemplary method within the technology.

FIG. 4 illustrates the steps in a method within this technology that can implement the example described in the preceding paragraph. A mobile communications device 500 is configured to maintain a locked function accumulator 302. The mobile communications device receives input to perform a locked function 304. The input to perform a locked function can be e.g., the depression of a certain button on the device 500, for example a camera button, or the touching of a certain area on a touch screen display 222. The current value of the locked function usage accumulator is compared to the predetermined limit 306. If the current value of the locked function usage accumulator is less than the predetermined limit the locked function, for example the taking of a photograph, is performed 308. In the method shown in FIG. 4, when a locked function, such as the acquisition of image data, is performed, the current value comprised by the locked function usage accumulator is incremented 410.

Within this technology, a predetermined limit can be a number of stored or acquired images, as described above, or a predetermined limit can be an amount of image data acquired or an amount of image data stored. A predetermined limit can be a percentage of available memory allocated for image data. A predetermined limit can also be a number of sound or audio recordings acquired or a number or sound or audio recordings stored. Acquired sound or audio recordings can be stored locally on the device 500 or externally to the device 500, on an application server 136 or on a computer 117, for example. A predetermined limit can further be an amount of sound or audio data. All examples listed in this description are non-limiting and do not exclude the implementation of the technology using other data types.

FIG. 5 illustrates a front view of a mobile communications device 500 in an unlocked mode. The device 500 may be configured to receive a signal to acquire image data via a camera 222 upon selection or depression of predefined keys in the keyboard 532, upon selection or depression of one of the keys or buttons in a navigation row 580 or upon actuation or depression of a cursor navigation tool 527. The device 500 comprises a microphone 236 that can be configured to cooperate with an audio recorder 223 to acquire sound data.

Figure 6:
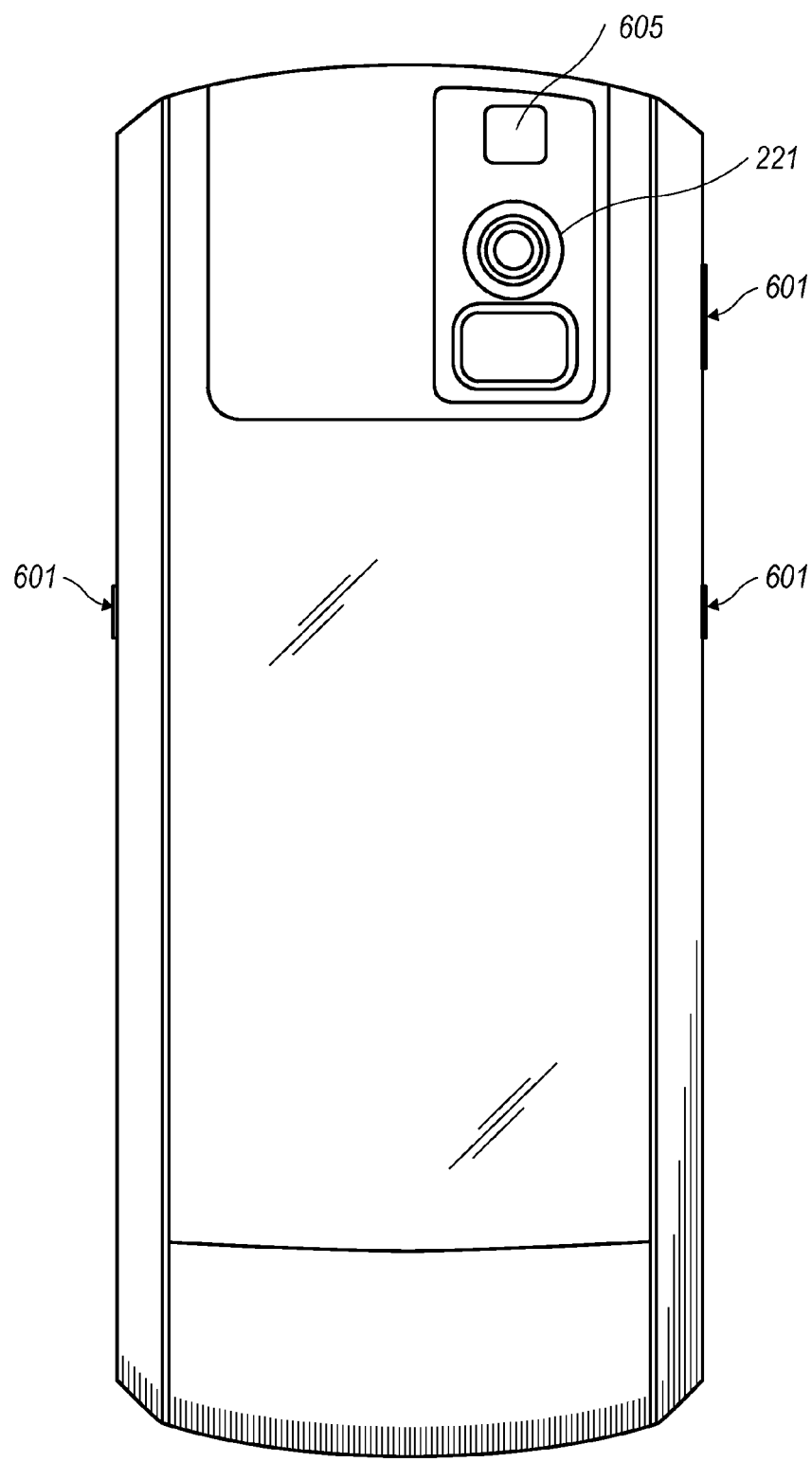
FIG. 6 illustrates a rear view of a mobile communications device to which example implementations of the technology can be applied.

FIG. 6 illustrates a back view of a mobile communications device 500 comprising a flash 605 and side buttons 601. A mobile communications device can be configured so as to receive a signal, to acquire image data, or take a photograph, upon the depression or the selection of one or more of the side buttons 601.

Figure 7:
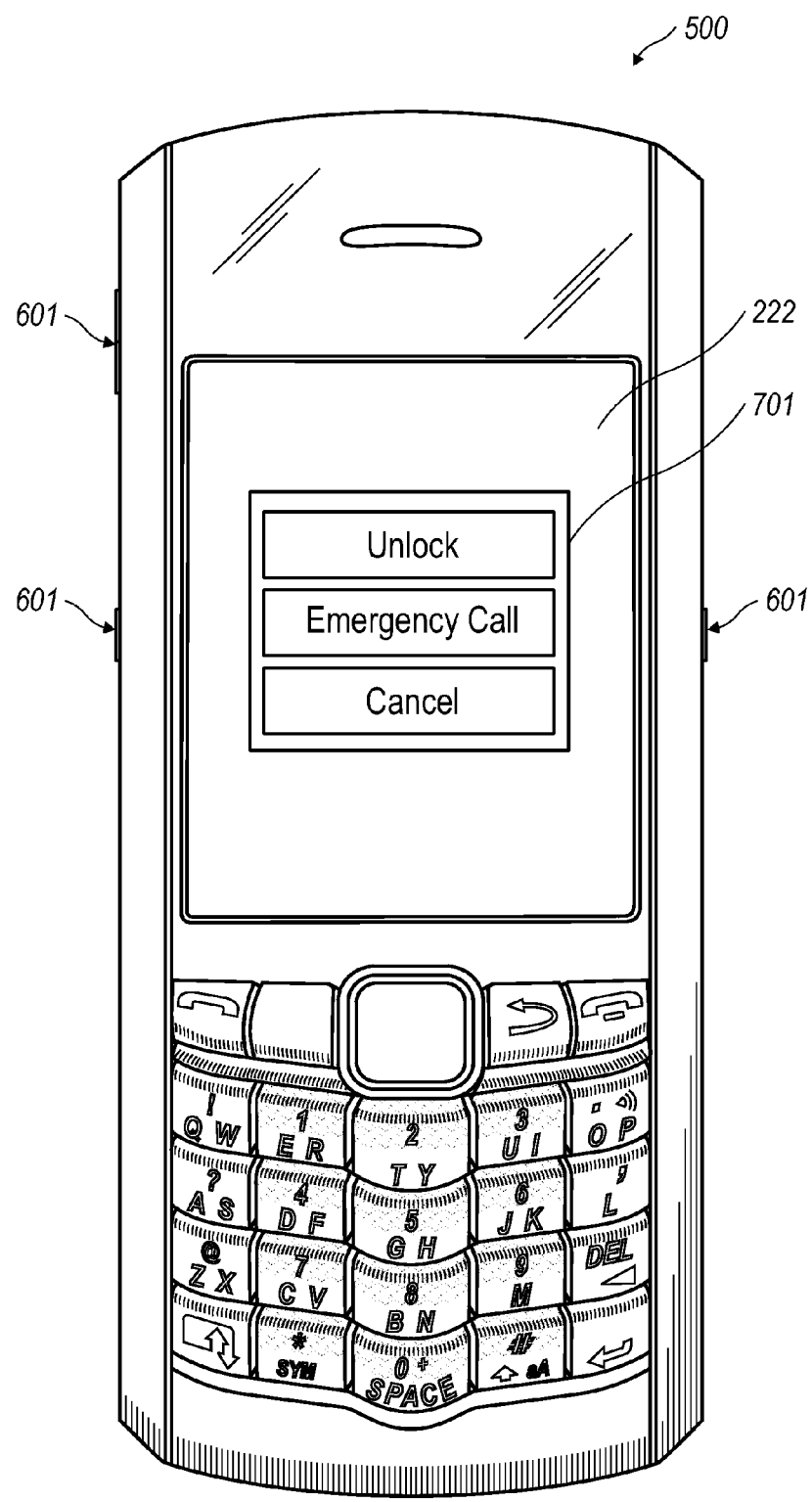
FIG. 7 illustrates an implementation of a front view of a mobile communications device with a display displaying device options.

FIG. 7 illustrates a locked mobile communications device 500 within this technology. The device 500 in FIG. 7 can be said to be in a locked mode. The display 222 of the device 500 shows a device locked menu. The device locked menu 701 comprises three selectable options: unlock, emergency call, and cancel. If unlock is selected, the display 222 will display an input screen to accept entry of a predetermined password. If emergency call is selected, the display 222 will display an input screen to accept allow confirmation that an emergency call is to be placed. If an emergency call is confirmed as desired, an emergency call will be placed according to preconfigured settings and programming of the device 500. As described above, a mobile communications device 500 can be configured to receive input to perform a locked function 304, such as taking a photograph. A mobile communications device can be configured so as to receive a signal, to acquire image data, or take a photograph, upon the depression or the selection of one or more of the side buttons 601. The locked device 500 may be configured to receive a signal to acquire image data via a camera 222 upon selection or depression of predefined keys in the keyboard 532, upon selection or depression of one of the keys or buttons in a navigation row 580 or upon actuation or depression of a cursor navigation tool 527.

Figure 8:
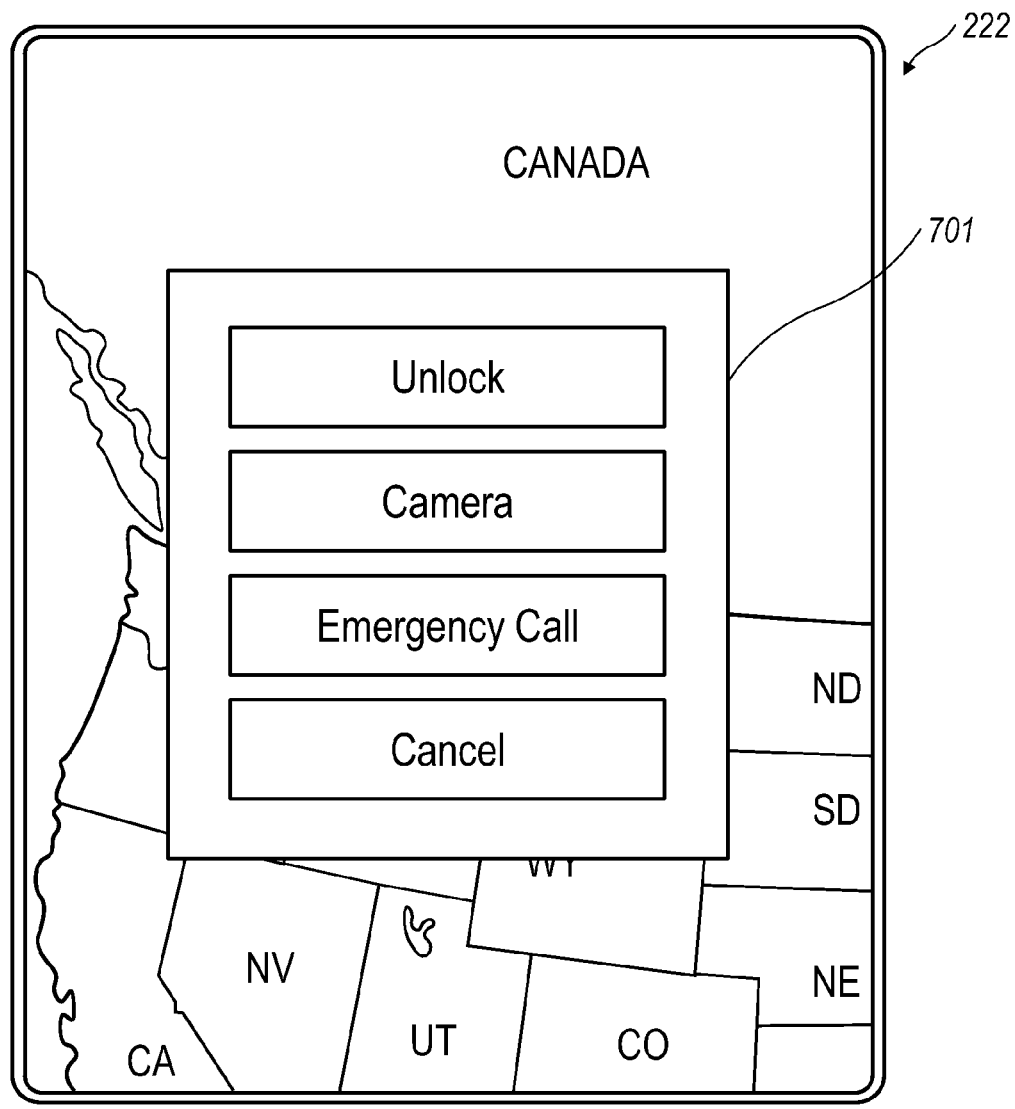
FIG. 8 illustrates a first alternative implementation of a mobile communications device display displaying alternative display options.

FIG. 8 illustrates an exemplary implementation of a display 222 portion of a mobile communications device 500 that is in a locked mode. In the implementation illustrated in FIG. 8, a lock menu 701 is displayed on the display 222. The device locked menu 701 comprises four selectable options: unlock, camera, emergency call, and cancel. Selection of the camera option can comprise the inputting of a request to acquire image data or take a photograph.

Figure 9:
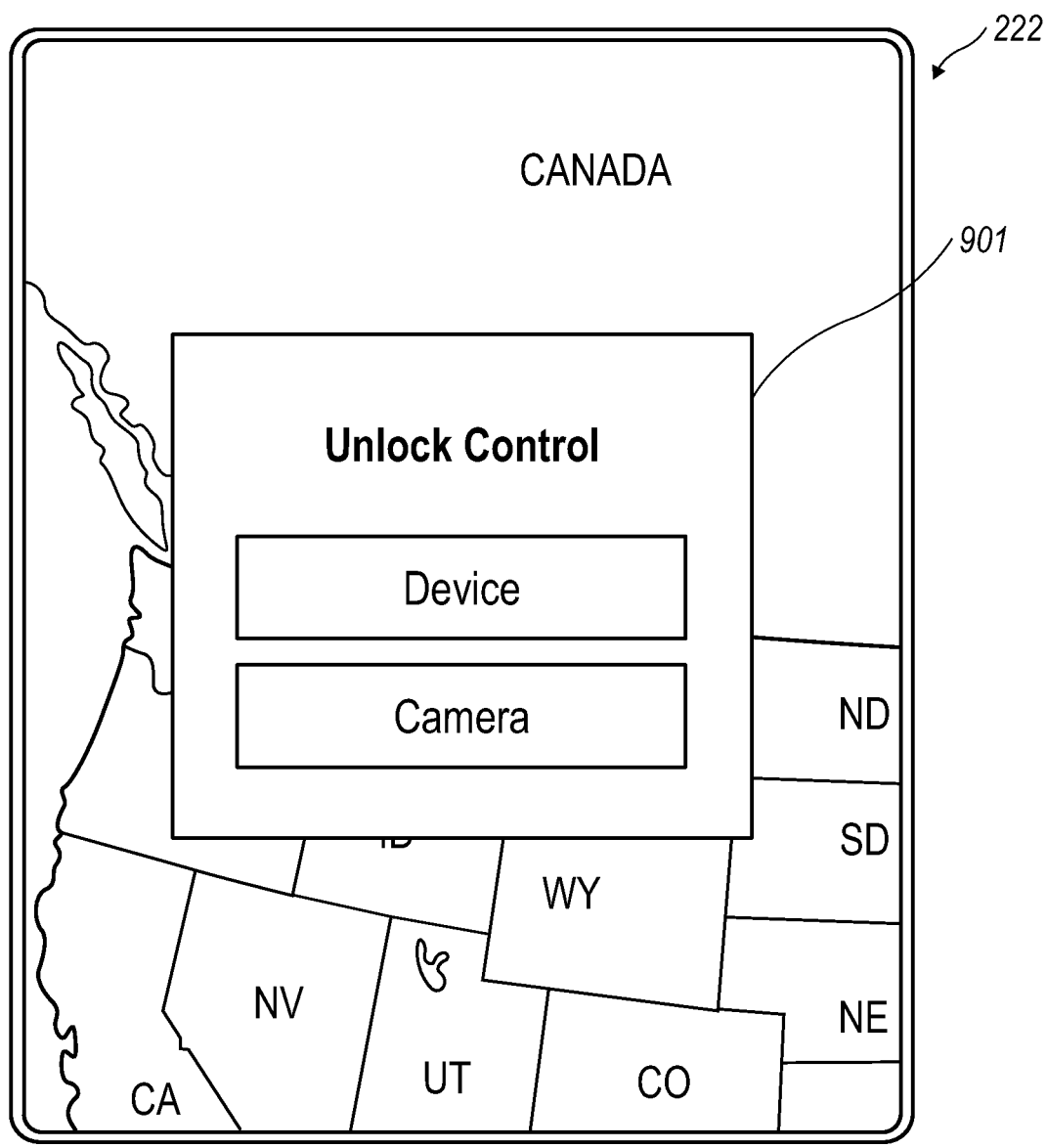
FIG. 9 illustrates a second alternative implementation of a mobile communications device display displaying alternative display options.

FIG. 9 illustrates an exemplary implementation of a display 222 portion of a mobile communications device 500 that is in a locked mode. The display 222 provides an unlock control menu listing two options: device and camera. If device is selected, a list of selectable locked functions within this technology can be presented. Alternatively, and depending on the manner in which the mobile communications device 500 is configured according to the technology, if device is selected, the performance of a predefined locked function, such as acquisition of sound data via a microphone 236 or an audio recorder 223 or a microphone 236 and an audio recorder 223 can be implemented according to the technology.

Figure 10:
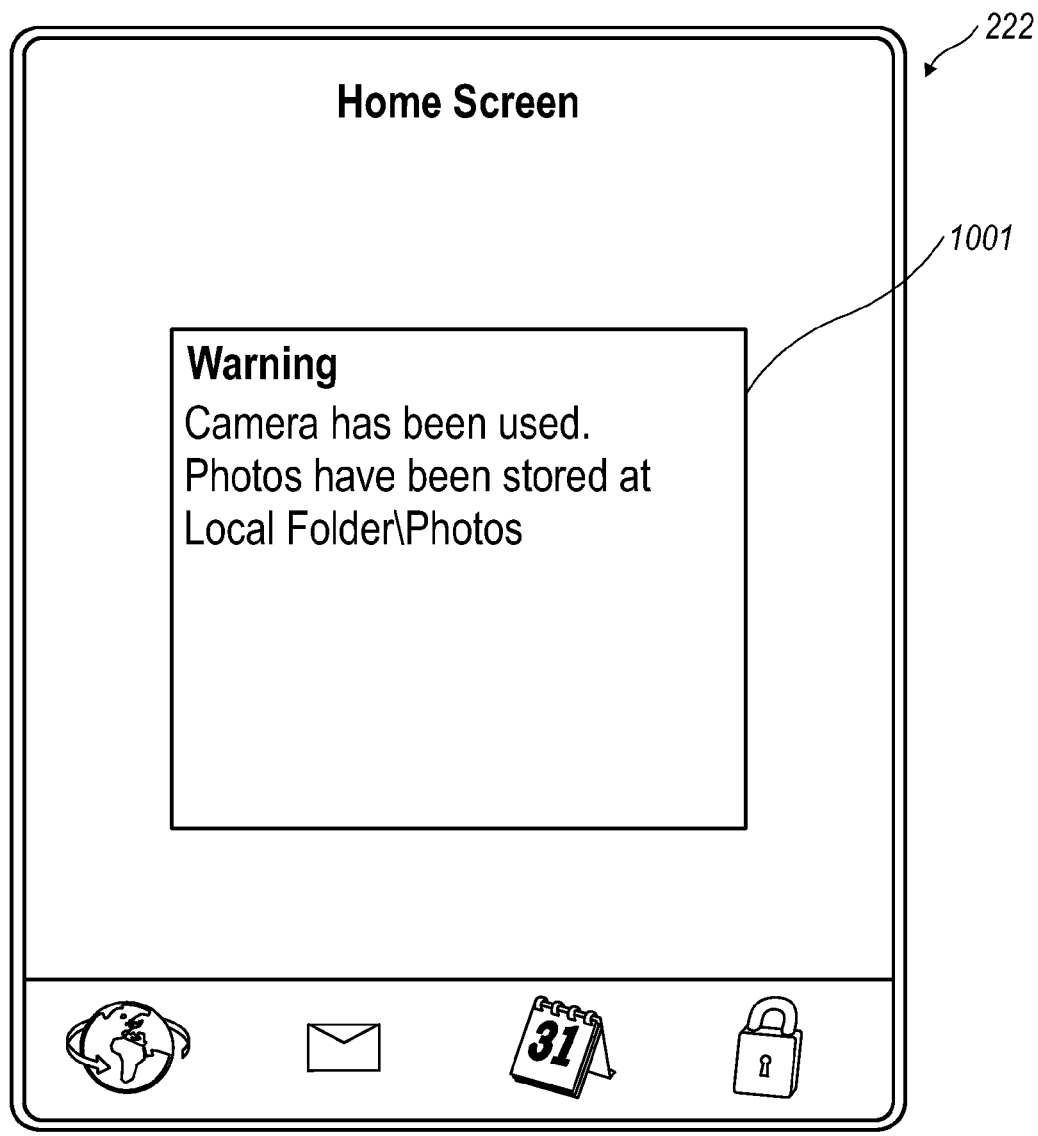
FIG. 10 illustrates a mobile communications device display displaying an exemplary notification within the technology.

FIG. 10 illustrates an exemplary display 222 of a mobile communications device 500 that displays an example of a locked function usage message 1001. The device 500 can be configured within this technology to present a message to an authorized user that a locked function has been used or enabled. In the implementation shown in FIG. 10, the display 222 presents information regarding where data acquired during a locked mode of the device 500, has been stored.

The device 500 can further be configured to display the amount of locked device usage remaining. For example the display 222 can be configured to present the number of photographs which may still be acquired while in the locked mode. The display 222 can be configured to display the amount of time remaining in which a locked function may be performed.

Within the technology, a mobile communications device 500 can be configured to limit the amount of time in which one or more locked functions can be performed. This can be implemented by maintaining a time calculator for determining the amount of time that has elapsed after a specified event. An example of a specified event within this technology is a specified performance of locked function. An example of a specified performance of a locked function is a first performance of a locked function. An example of first performance of a locked function within the technology could be the first time image data is acquired since the last time the device 500 was unlocked via a password.

In further implementations of the technology, a mobile communications device 500 can be configured to maintain a locked usage accumulator and time calculator for determining an amount of lapsed time such that usage of one or more locked functions can be limited to both a predetermined limit of usage and a predetermined amount of time.

To limit usage of one or more locked functions according to both amount of locked device usage and an amount of time, whether the limit is acquisition of a predetermined number of photo images, a predetermined amount of image data acquired or stored, a predetermined number of sound recordings, or a predetermined amount of sound data acquired or stored, or some other limit, a mobile communications device 500 can be configured to maintain a locked function usage accumulator, while also maintain in a time calculator. The locked function usage accumulator can comprise a current value and a predetermined limit. A device 500 can be configured to receive input to perform a locked function, such as the depression of a predetermined button or selection of a predetermined menu option, compare the accumulator current value to the predetermined limit and perform the locked function when the accumulator is less than the predetermined limit. As described above, a mobile communications device 500 can be further configured to increment the accumulator current value upon performing the locked function and to maintain a time calculator for determining an amount of elapsed time. The device 500 can be further configured to lock the mobile communications device 500 after a predetermined amount of time has elapsed since a specified event.

Within the technology, a mobile communications device 500 can be configured or programmed send an email notification via a network 124 to an authorized user's email address notifying him or her that a locked function, such as the acquisition of image data via a device camera 221, has occurred. In a further implementation of the technology, a device 500 may be configured to display a message 1001 on the device display 221 regarding the performance of one or more locked functions. An example of the presentation of such a message is depicted in FIG. 10.

The technology can take the forms of hardware, or both hardware and software elements. In some implementations, the technology is implemented in software, which includes but is not limited to firmware, resident software, microcode, a Field Programmable Gate Array (FPGA) or Application-Specific Integrated Circuit (ASIC), etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device 500. The medium can be an electronic, magnetic, optical, electromagnetic, infrared, or semiconductor system (or apparatus or device 500) or a propagation medium (though propagation mediums as signal carriers per se are not included in the definition of physical computer-readable medium). Examples of a physical computer-readable medium include a semiconductor or solid state memory, removable memory connected via USB, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD, and Blu Ray™. Both processors and program code for implementing each as aspect of the technology can be centralized or distributed (or a combination thereof).

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device 500. The medium can be an electronic, magnetic, optical, electromagnetic, infrared, or semiconductor system (or apparatus or device 500) or a propagation medium (though propagation mediums as signal carriers per se are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof).

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem, WiFi, and Ethernet cards are just a few of the currently available types of network adapters. Such systems can be centralized or distributed, e.g., in peer-to-peer and client/server configurations. In some implementations, the data processing system is implemented using one or both of FPGAs and ASICs.

The invention claimed is:

1. A mobile communications device comprising:
   at least one processor;
   at least one computer readable medium in communication with the processor; and
   at least one program module stored on the at least one medium and operable upon execution by the processor to:
   maintain a locked function usage accumulator associated with a camera of the mobile communications device, the locked function usage accumulator comprising a current value and a predetermined limit, the current value corresponding to an amount of acquired image data and the predetermined limit corresponding to a percentage of available memory allocated for storage of image data;
   receive a touch input on a predetermined area on a touch screen of the mobile communications device to activate the camera to perform a locked function of taking a photo, while the mobile communications device is in a locked mode;
   compare the accumulator current value to the predetermined limit; and
   perform the locked function of taking the photo when the accumulator current value is less than the predetermined limit.

2. The mobile communications device of claim 1, the at least one program module further operable, upon execution by the processor to:
   increment the accumulator current value upon taking the photo.

3. The mobile communications device of claim 1, the at least one program module operable, upon execution by the processor to:
   increment the accumulator current value upon taking the photo;
   maintain a time calculator for determining an amount of elapsed time; and
   lock the mobile communications device after a predetermined amount of time has elapsed since a specified event.

4. A processor-implemented method for enabling limited access to a locked function in a mobile communications device, the method comprising:
   maintaining a locked function usage accumulator associated with a camera of the mobile communications device, the locked function usage accumulator comprising a current value and a predetermined limit, the current value corresponding to an amount of acquired image data and the predetermined limit corresponding to a percentage of available memory allocated for storage of image data;
   receiving a touch input on a predetermined area on a touch screen of the mobile communications device to activate the camera to perform a locked function of taking a photo while the communications device is in a locked mode;
   comparing the accumulator current value to the predetermined limit; and
   taking the photo when the accumulator current value is less than the predetermined limit.

5. The processor-implemented method of claim 4, further comprising:
   incrementing the accumulator current value upon taking the photo.

6. The processor-implemented method of claim 4, further comprising:
   maintaining a time calculator for determining an amount of elapsed time; and
   locking the mobile communications device after a predetermined amount of time has elapsed since a specified event.

7. The processor-implemented method of claim 4, further comprising:
   incrementing the accumulator current value upon taking the photo;
   maintaining a time calculator for determining an amount of elapsed time; and
   locking the mobile communications device after a predetermined amount of time has elapsed since a specified event.

8. The processor-implemented method of claim 7, wherein the specified event is a first performance of taking a photo.

9. A mobile communications device comprising:
   at least one non-transitory computer readable medium; and
   at least one program module stored on the at least one medium and operative upon execution by at least one processor to:
      maintain a locked function usage accumulator associated with a camera of the mobile communications device, the locked function usage accumulator comprising a current value and a predetermined limit, the current value corresponding to a number of acquired images and the predetermined limit corresponding to a predetermined number of stored images;
      receiving a touch input on a predetermined area on a touch screen of the mobile communications device to activate the camera to perform a locked function of taking a photo while the communications device is in a locked mode;
      compare the accumulator current value to the predetermined limit; and
      take the photo when the accumulator current value is less than the predetermined limit.

10. The device of claim 9, the at least one program module further operative, upon execution by at least one processor to:
   increment the accumulator current value upon taking the photo.

11. The device of claim 9, the at least one program module further operative, upon execution by at least one processor to:
   maintain a time calculator for determining an amount of elapsed time; and
   lock the electronic device after a predetermined amount of time has elapsed since a specified event.

12. The device of claim 9, the at least one program module further operative, upon execution by at least one processor to:
   increment the accumulator current value upon taking the photo;
   maintain a time calculator for determining an amount of elapsed time; and
   lock the mobile communications device after a predetermined amount of time has elapsed since a specified event.

13. The device of claim 12, wherein the specified event is a first performance of taking a photo.

* * * * *